(12) United States Patent
Coleridge et al.

(10) Patent No.: US 6,803,426 B2
(45) Date of Patent: Oct. 12, 2004

(54) FUNCTIONAL FLUOROPOLYMERS AND THERMOSETTING COMPOSITIONS CONTAINING SAME

(75) Inventors: Edward R. Coleridge, Lower Burrell, PA (US); Edward R. Millero, Jr., Gibsonia, PA (US); Robert T. Pogue, Pittsburgh, PA (US); Truman F. Wilt, Clinton, PA (US); Carole A. Conley, Verona, PA (US); Shawn A. DeSaw, McMurray, PA (US); Robert A. Montague, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/357,580

(22) Filed: Feb. 4, 2003

(65) Prior Publication Data

US 2003/0171498 A1 Sep. 11, 2003

Related U.S. Application Data

(63) Continuation-in-part of application No. 10/077,645, filed on Feb. 15, 2002.

(51) Int. Cl.[7] .................................................. C08F 8/30
(52) U.S. Cl. ............................. 525/326.3; 525/326.6; 525/328.8; 525/329.2; 525/329.4; 525/329.9; 525/330.1; 525/374; 525/379; 525/394; 525/386; 526/249
(58) Field of Search .................. 526/249; 525/326.3, 525/326.6, 328.8, 329.2, 329.4, 329.9, 330.1, 374, 379, 384, 386

(56) References Cited

U.S. PATENT DOCUMENTS

| | | | |
|---|---|---|---|
| 2,378,629 A | 6/1945 | Hanford ..................... 260/78 |
| 2,411,599 A | 11/1946 | Sparks et al. ............... 204/162 |
| 2,468,664 A | 4/1949 | Hanford et al. ............. 260/86 |
| 2,531,196 A | 11/1950 | Brubaker et al. .......... 260/85.5 |
| 3,380,974 A | 4/1968 | Stilmar ....................... 260/80 |
| 3,475,391 A | * 10/1969 | Coker et al. ................. 526/87 |
| 3,947,338 A | 3/1976 | Jerabek et al. .............. 204/181 |
| 3,984,299 A | 10/1976 | Jerabek ...................... 204/181 |
| 4,147,679 A | 4/1979 | Scriven et al. ....... 260/29.2 TN |
| 4,147,688 A | 4/1979 | Makhlouf et al. .... 260/33.6 EP |
| 4,220,679 A | 9/1980 | Backhouse ................. 427/401 |
| 4,345,057 A | 8/1982 | Yamabe et al. ............ 526/247 |
| 4,403,003 A | 9/1983 | Backhouse ............... 427/407.1 |
| 4,487,893 A | 12/1984 | Yamabe et al. ............ 525/386 |
| 4,731,288 A | * 3/1988 | Mizuno et al. ............. 428/333 |
| 4,889,890 A | 12/1989 | Kerr et al. .................. 525/113 |
| 4,937,298 A | 6/1990 | Pettit, Jr. et al. .......... 525/176 |
| 4,997,900 A | 3/1991 | Brinkman .................... 528/45 |
| 5,071,904 A | 12/1991 | Martin et al. ............... 524/458 |
| 5,098,955 A | 3/1992 | Pettit, Jr. .................... 525/194 |
| 5,169,915 A | * 12/1992 | Mohri et al. ............... 526/247 |
| 5,202,382 A | 4/1993 | Pettit, Jr. .................... 525/108 |
| 5,214,101 A | 5/1993 | Pettit, Jr. et al. .......... 525/176 |
| 5,216,081 A | * 6/1993 | Mohri et al. ............... 525/199 |
| 5,356,973 A | 10/1994 | Taljan et al. ............... 524/314 |
| 5,407,707 A | 4/1995 | Simeone et al. ........... 427/410 |
| 5,439,896 A | 8/1995 | Ito et al. ..................... 525/107 |
| 5,508,337 A | 4/1996 | Wamprecht et al. ....... 524/507 |
| 5,510,444 A | 4/1996 | Halpaap et al. .............. 528/45 |
| 5,552,487 A | 9/1996 | Clark et al. ................. 525/131 |
| 5,554,692 A | 9/1996 | Ross .......................... 525/124 |
| 5,663,240 A | 9/1997 | Simeone et al. ......... 525/327.3 |
| 5,710,214 A | 1/1998 | Chou et al. ................. 525/124 |
| 5,777,061 A | 7/1998 | Yonek et al. ................. 528/45 |
| 5,807,937 A | 9/1998 | Matyjaszewski et al. ... 526/135 |
| 5,976,701 A | 11/1999 | Barancyk et al. ........ 428/423.1 |
| 5,989,642 A | 11/1999 | Singer et al. ............ 427/407.1 |
| 6,111,001 A | 8/2000 | Barancyk et al. .......... 524/211 |
| 6,114,489 A | 9/2000 | Vicari et al. ................. 528/84 |
| 6,153,697 A | 11/2000 | Montague et al. .......... 525/123 |
| 6,281,272 B1 | 8/2001 | Baldy et al. ................ 523/501 |

FOREIGN PATENT DOCUMENTS

| | | |
|---|---|---|
| GB | 1121614 | 7/1968 |
| GB | 1213171 | 11/1970 |
| JP | 04-004246 | 1/1992 |

OTHER PUBLICATIONS

Greenly, "Q and e Values for Free Radical Copolymerizations of Vinyl Monomers and Telogens," *Polymer Handbook*, Fourth Edition, John Wiley & Sons, Inc., pp. 309–319, 1999.

(List continued on next page.)

Primary Examiner—Bernard Lipman
(74) Attorney, Agent, or Firm—William J. Uhl

(57) ABSTRACT

A composition that includes a fluorine-containing copolymer containing at least 30 mol % of residues having the following alternating structural unit:

—[DM—AM]— where DM represents a residue from a donor monomer having the following structure (I):

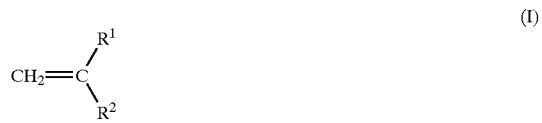

where $R^1$ is linear or branched $C_1$ to $C_4$ alkyl; $R^2$ is selected from methyl, linear, cyclic or branched $C_1$ to $C_{20}$ alkyl, alkenyl, aryl, alkaryl and aralkyl; and AM represents an acceptor monomer. The copolymer contains at least 5 wt. % fluorine. The composition may include co-reactive functional groups and may be a thermosetting composition, which can be used to coat a substrate. The thermosetting composition may be part of a multi-component composite coating composition that includes a base coat deposited from a pigmented film-forming composition and a substantially pigment free top coat applied over at least a portion of the base coat.

28 Claims, No Drawings

OTHER PUBLICATIONS

Odian, "Chain Polymerization," *Principles of Copolymerization*, Third Edition, John Wiley & Sons, Inc., pp. 452–491, 1991.

Cowie, Alternating Copolymers, Plenum Press, pp. 1–137, 1985.

Rzaev et al., "Complex–Radical Copolymerization of 2,4,4–trimethylpentene–1 with Maleic Anhydride," *Eur. Polym. J.*, vol. 34, No. 7, pp. 981–985, 1998.

Mashita et al., "Alternating Copolymerization of Isobutylene and Acrylic Ester with Alkylboron Halide," *Polymer*, vol. 36, No. 15, pp. 2973–2982, 1995.

Mashita et al., "Alternating Copolymers of Isobutylene and Acrylic Ester by Complexed Copolymerization," *Polymer*, vol. 36, No. 15, pp. 2983–2988, 1995.

Kuntz et al., "Poly[2,2–Dimethyl–4–(methoxylcarbonyl)-butylene]: Synthesis with an Ethylaluminum Sesquichloride–Peroxide Initiator and NMR Characterization," *J. of Polymer Science: Polymer Chemistry Edition*, vol. 16, pp. 1747–1753, 1978.

Hirooka et al., "Complexed Copolymerization of Vinyl Compounds with Alkylaluminum Halides," *Journal of Polymer Science: Polymer Chemistry Edition*, vol. 11, pp. 1281–1306, 1973.

ASTM D–1200—94, "Standard Test Method for Viscosity by Ford Viscosity Cup," *Amer. Soc. Test. Mat.*, pp. 103–105, 1994.

ASTM D–2369—92, "Standard Test Method for Volatile Content of Coatings," *Amer. Soc. Test. Mat.*, pp. 46–48, 1992.

ASTM D–3359—97, "Standard Test Methods for Measuring Adhesion by Tape Test," *Amer. Soc. Test. Mat.*, pp. 1–7, 1998.

ASTM D–4370—84, "Standard Test Methods for Acid and Base Milliequivalent Content of Electrocoat Bath," *Amer. Soc. Test. Mat.*, pp. 780–782, 1984.

"Reference Method 24: Determination of volatile Matter Content, Water Content, Density, Volume Solids, and Weight Solids of Surface Coatings," *Federal Register*, EPA Refernce Methods 24 and 24 A, vol. 57, No. 133, pp. 125–127, 1992.

* cited by examiner

FUNCTIONAL FLUOROPOLYMERS AND THERMOSETTING COMPOSITIONS CONTAINING SAME

CROSS-REFERENCE TO RELATED APPLICATION

This application is a Continuation-in-Part of U.S. application Ser. No. 10/077,645, filed Feb. 15, 2002, entitled "Thermosetting Compositions Containing Alternating Copolymers of Isobutylene Type Monomers," which is hereby incorporated by reference.

BACKGROUND OF THE INVENTION

1. Field of the Invention

The present invention relates generally to fluoropolymers and thermosetting compositions containing fluoropolymers. More specifically, the present invention is directed to fluoropolymers containing functional groups and thermosetting compositions that contain functional fluoropolymers.

2. Description of Related Art

Coatings derived from compositions containing fluoropolymers typically provide good chemical resistance, weather resistance, and heat resistance. Due to these properties, interest in using fluoropolymer-based paints has increased in various areas. For example, fluoropolymer-containing paints are used as weather resistant paints in the areas of architecture, automobile, and chemical engineering. The fluoropolymers used in such paints typically include a fluorocarbon monomer, such as chlorotrifluoroethylene, tetrafluoroethylene, or vinylidene fluoride, and another monomer, such as a vinyl ester or a vinyl ether, usually added to increase the solubility of the resulting fluoropolymer.

As an example, U.S. Pat. No. 4,345,057 to Yamabe et al. discloses a fluoropolymer having improved curing properties. Coatings using the fluoropolymer reportedly have a glossy finish, good chemical resistance, and good weatherability.

In many cases, the durability of a coating, such as its weatherability and/or chemical resistance, will depend on obtaining an optimum balance of physical properties, such as the hardness and flexibility of a coating film. Generally speaking, obtaining this optimum balance has been an elusive goal.

Moreover, the use of fluoropolymer-containing coating compositions has been limited due to the high cost of such coatings, due in part to the cost of the fluorocarbon monomers.

Functional fluoropolymers are typically random copolymers that include functional group-containing acrylic and/or methacrylic monomers. Such a functional fluoropolymer will contain a mixture of polymer molecules having varying individual functional equivalent weights and polymer chain structures. In such a copolymer, the functional groups are located randomly along the polymer chain. Moreover, the number of functional groups is not divided equally among the polymer molecules, such that some polymer molecules may actually be free of functionality.

In a thermosetting composition, the formation of a three-dimensional crosslinked network is dependent on the functional equivalent weight as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the finally formed thermoset coating.

It would be desirable to develop fluoropolymer based thermosetting compositions that are low cost, have a predictable polymer architecture and provide an optimum balance of film hardness and flexibility in a durable coating.

SUMMARY OF THE INVENTION

The present invention is directed to a composition that includes a fluorine-containing copolymer containing at least 30 mol % of residues having the following alternating structural unit:

—[DM—AM]— where DM represents a residue from a donor monomer having the following structure (I):

where $R^1$ is linear or branched $C_1$ to $C_4$ alkyl; $R^2$ is selected from methyl, linear, cyclic or branched $C_1$ to $C_{20}$ alkyl, alkenyl, aryl, alkaryl, and aralkyl; and AM represents an acceptor monomer. The copolymer contains at least 5 wt. % fluorine.

The present invention is also directed to a composition that includes the copolymer described above, where the composition contains co-reactive functional groups. A non-limiting example of such a composition is a thermosetting composition. The present invention is also directed to a substrate, where at least a portion of the substrate is coated with the thermosetting composition.

The present invention is further directed to a thermosetting composition that includes the copolymer described above, containing reactive functional groups and at least one other component that contains functional groups that are reactive with the functional groups of the copolymer. The present invention is additionally directed to a substrate, where at least a portion of the substrate is coated with the thermosetting composition.

The present invention is still further directed to a multi-component composite coating composition that includes a base coat deposited from a pigmented film-forming composition and a substantially pigment free top coat applied over at least a portion of the base coat. The base coat and/or the top coat include one of the thermosetting compositions described above. The present invention is also directed to substrates where at least a portion of the substrate is coated with the multi-component composite coating composition.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer, as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable, ethylenically unsaturated group that has relatively high electron density in the ethylenic double bond, and the term "acceptor monomer" refers to monomers that have a polymerizable, ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable, ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of –1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than –1.5, and the term "mild donor monomer" is meant to include those monomers with an e value of less than 0.5 to those with an e value of –1.5.

As used herein and in the claims, the term "fluorinated" is used to describe a material, typically a polymer or copolymer, that contains fluorine atoms.

The present invention is directed to a composition that includes a fluorine-containing copolymer. The copolymer includes at least 30 mol %, in many cases at least 40 mol %, typically at least 50 mol %, in some cases at least 60 mol %, and in other cases at least 75 mol % of residues of the copolymer derived from alternating sequences of donor monomer—acceptor monomer pairs having the alternating monomer residue units of structure:

—[DM—AM]— where DM represents a residue from a donor monomer and AM represents a residue from an acceptor monomer. The copolymer may be a 100% alternating copolymer of DM and AM. More particularly, at least 15 mol % of the copolymer comprises a donor monomer, which is an isobutylene-type monomer, having the following structure (I):

(I)

where $R^1$ is linear or branched $C_1$ to $C_4$ alkyl; $R^2$ is one or more of methyl, linear, cyclic, or branched $C_1$ to $C_{20}$ alkyl, alkenyl, aryl, alkaryl, and aralkyl. Further, at least 15 mol % of the copolymer includes an acceptor monomer. The group $R^2$ may include one or more functional groups selected from epoxy, carboxylic acid, hydroxy, thiol, isocyanate, capped isocyanate, amide, amine, aceto acetate, methylol, methylol ether, oxazoline carbamate, and beta-hydroxyalkylamide.

Of note in the present invention, the copolymer contains at least 5 wt. % fluorine, in some cases at least 10 wt. % fluorine and in other cases at least 15 wt. % fluorine, and up to 50 wt. % fluorine, in some cases up to 40 wt. % fluorine, in other cases up to 35 wt. % fluorine and in some situations up to 30 wt. % fluorine. The copolymer may contain fluorine in any range of values inclusive of those stated above. Further, the copolymer incorporates a substantial portion of alternating residues of a mild donor monomer as described by structure I and a mild acceptor monomer. The acceptor monomer will include vinyl monomers having fluoro and/or chloro substituents and may include acrylic acceptor monomers.

Thus, the present composition includes the aforementioned structural unit —[DM—AM]— in the fluorine-containing copolymer, in which the structural unit may specifically include the following structural units (II):

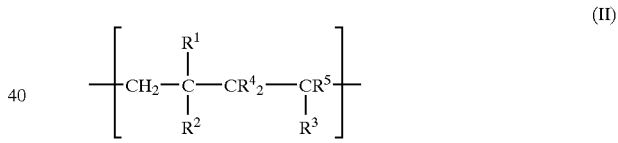

(II)

wherein $R^1$ and $R^2$ are as defined above; $R^3$ is a group that includes one or both of chlorine and fluorine; and $R^4$ and $R^5$ are independently selected from H, Cl, and F.

A particular advantage of the present fluorine-containing copolymer is its potentially low cost.

Regarding the donor monomer and acceptor monomer in the —[DM—AM]— structural unit, a non-limiting list of published e values for monomers that may be included as donor monomer and acceptor monomer in the present invention are shown in Table 2.

TABLE 2

| Alfrey-Price e values for Selected Monomers | |
|---|---|
| Monomer | e value |
| Monomers of structure 1 | |
| Isobutylene | –1.20[1] |
| Diisobutylene | 0.49[2] |
| Fluorinated Monomers | |
| Vinyl fluoride | 0.72 |
| Chlorotrifluoro ethylene | 1.56 |
| Tetrafluoro ethylene | 1.63 |

TABLE 2-continued

Alfrey-Price e values for Selected Monomers

| Monomer | e value |
|---|---|
| Acrylic Monomers | |
| Acrylic Acid | 0.88[1] |
| Acrylamide | 0.54[1] |
| Acrylonitrile | 1.23[1] |
| Methyl Acrylate | 0.64[1] |
| Ethyl Acrylate | 0.55[1] |
| Butyl Acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

Any suitable donor monomer may be used in the present invention. Suitable donor monomers that may be used include strong donor monomers and mild donor monomers. The present invention is particularly useful for preparing alternating copolymers where a mild donor molecule is used. The present copolymers will include a mild donor monomer described by structure I, such as isobutylene and diisobutylene, dipentene, isoprenol and 1-octene, and may additionally include other suitable mild donor monomers. The mild donor monomer of structure I is present in the copolymer composition at a level of at least 15 mol %, in some cases at least 25 mol %, typically at least 30 mol % and in some cases at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure I may be present in the copolymer composition in any range of values inclusive of those stated above.

Suitable other donor monomers that may be used in the present invention include, but are not limited to, ethylene, butene, styrene, substituted styrenes, methyl styrene, substituted styrenes, vinyl ethers, vinyl esters, vinyl pyridines, divinyl benzene, vinyl naphthalene, and divinyl naphthalene. Vinyl esters include vinyl esters of carboxylic acids, which include, but are not limited to, vinyl acetate, vinyl butyrate, vinyl 3,4-dimethoxybenzoate, and vinyl benzoate. The use of other donor monomers is optional; when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer—acceptor monomer units along the copolymer chain. The acceptor monomer may include monomers having the structure $CR^4_2=CR^3R^5$, where $R^3$ is a group that includes one or both of chlorine and fluorine; and $R^4$ and $R^5$ are independently selected from H, Cl, and F.

Additionally, other suitable acceptor monomers may be used. Suitable acceptor monomers include strong acceptor monomers and mild acceptor monomers. A non-limiting class of suitable acceptor monomers are those described by the structure (III):

where W is selected from the group consisting of —CN, —X, and —C(=O)—Y, wherein Y is selected from the group consisting of —NR$^3_2$, —O—R$^5$—O—C(=O)—NR$^3_2$, and —OR$^4$; R$^3$ is selected from the group consisting of H, linear or branched C$_1$ to C$_{20}$ alkyl, and linear or branched C$_1$ to C$_{20}$ alkylol; R$^4$ is selected from the group consisting of H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical; R$^5$ is a divalent linear or branched C$_1$ to C$_{20}$ alkyl linking group; and X is a halide.

A class of mild acceptor monomers that may be included in the present copolymer composition are acrylic acceptor monomers. Suitable acrylic acceptor monomers include those described by structure (IV):

where Y is selected from the group consisting of —NR$^3_2$, —O—R$^5$—O—C(=O)—NR$^3_2$, and —OR$^4$; R$^3$ is selected from the group consisting of H, linear or branched C$_1$ to C$_{20}$ alkyl, and linear or branched C$_1$ to C$_{20}$ alkylol; R$^4$ is selected from the group consisting of H, poly(ethylene oxide), poly(propylene oxide), linear, cyclic, or branched C$_1$ to C$_{20}$ alkyl, alkylol, aryl and aralkyl, linear or branched C$_1$ to C$_{20}$ fluoroalkyl, fluoroaryl and fluoroaralkyl, a siloxane radical, a polysiloxane radical, an alkyl siloxane radical, ah ethoxylated trimethylsilyl siloxane radical, and a propoxylated trimethylsilyl siloxane, radical; and R$^5$ is a divalent linear or branched C$_1$ to C$_{20}$ alkyl linking group.

Particularly useful types of acrylic acceptor monomers are those described by structure IV, where Y includes at least one functional group of epoxy, carboxylic acid, hydroxy, thiol, isocyanate, capped isocyanate, amide, amine, aceto acetate, methylol, methylol ether, oxazoline carbamate, and/or beta-hydroxyalkylamide.

Examples of suitable acceptor monomers include, but are not limited to, chlorotrifluoroethylene, tetrafluoroethylene, trifluoroethylene, difluoroethylene, vinyl fluoride, hexafluoropropylene, and mixtures thereof, and optionally further selected from acrylic acid, acrylic acid esters, acrylamide, N-alkyl substituted acrylamides, acrylonitrile, hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, perfluoro methyl ethyl acrylate, perfluoro ethyl ethyl acrylate, perfluoro butyl ethyl acrylate, trifluoromethyl benzyl acrylate, perfluoro alkyl ethyl, acryloxyalkyl terminated polydimethylsiloxane, acryloxyalkyl tris (trimethylsiloxy silane), acryloxyalkyl trimethylsiloxy terminated polyethylene oxide, chlorotrifluoro ethylene, glycidyl acrylate, 2-ethylhexyl acrylate, n-butoxy methyl acrylamide, and mixtures thereof.

The acrylic acceptor monomers are present in the copolymer composition at a level of at least 15 mol %, in some cases at least 25 mol %, typically at least 30 mol %, and, in some cases, at least 35 mol %. The acrylic acceptor monomers of structure III are present in the copolymer composition at a level of up to 50 mol %, in some cases up to 47.5 mol %, typically up to 45 mol %, and, in some cases, up to 40 mol %. The level and type of acceptor monomers used is determined by the properties that are to be incorporated into the copolymer composition. Residues from the acceptor monomers may be present in the copolymer composition in any range of values inclusive of those stated above.

Suitable other mild acceptor monomers that may be used in the present invention include, but are not limited to, acrylonitrile, methacrylonitrile, crotonic acid, vinyl alkyl sulfonates, and acrolein. The use of other mild acceptor monomers is optional; when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

The present copolymer has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 30,000, in some cases not exceed 25,000, in other cases not exceed 20,000, and, in certain instances, not exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the present copolymer is not always critical. The polydispersity index of the copolymer is usually less than 4, in many cases less than 3.5, typically less than 3, and, in some cases, less than 2.5. As used herein, and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

The copolymer composition of the present invention may have all of the incorporated monomer residues in an alternating architecture. A non-limiting example of a copolymer segment having 100% alternating architecture of diisobutylene (DIIB) and hexafluoropropylene (HFP) is shown by structure V:

(V) —HFP-DIIB—HFP-DIIB—HFP-DIIB—HFP-DIIB—HFP-DIIB—HFP-DIIB—HFP—

However, in most instances, the present copolymer will contain alternating segments and random segments as shown by structure VI, a copolymer of DIIB, HFP, and other monomers, M:

Structure VI shows an embodiment of the present invention where the copolymer may include alternating segments as shown in the boxes and random segments as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure VI.

The other ethylenically unsaturated monomers include any suitable monomer not traditionally categorized as being an acceptor monomer or a donor monomer.

The other ethylenically unsaturated monomers, residue of monomer M of structure VI, is derived from at least one ethylenically unsaturated, radically polymerizable monomer. As used herein and in the claims, "ethylenically unsaturated, radically polymerizable monomer," and like terms, are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, monomer residues derived from monomers of the general formula VII:

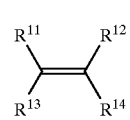

(VII)

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R^{13}$ is selected from the group consisting of H, $C_1$–$C_6$ linear, cyclic, or branched alkyl, $COOR^{18}$, wherein $R^{18}$ is selected from the group consisting of H, an alkali metal, a $C_1$ to $C_6$ alkyl group, glycidyl, and aryl.

Specific examples of other monomers, M, that may be used in the present invention include methacrylic monomers and allylic monomers. Residue of monomer M may be derived from at least one of alkyl methacrylate having from 1 to 20 carbon atoms in the alkyl group. Specific examples of alkyl methacrylates having from 1 to 20 carbon atoms in the alkyl group from which residue of monomer M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, and 3,3,5-trimethylcyclohexyl methacrylate, as well as functional methacrylates, such as hydroxyalkyl methacrylates, oxirane functional methacrylates, and carboxylic acid functional methacrylates.

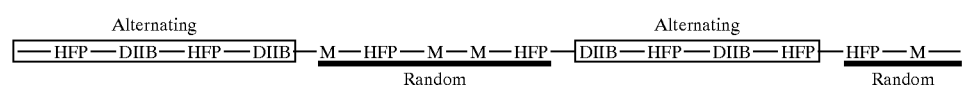

(VI)

Residue of monomer M may also be selected from monomers having more than one methacrylate group, for example, methacrylic anhydride and diethyleneglycol bis (methacrylate).

As used herein and in the claims, by "allylic monomer(s)" what is meant is monomers containing substituted and/or unsubstituted allylic functionality, i.e., one or more radicals represented by the following general formula VIII,

$$H_2C=C(R^{10})-CH_2- \quad\quad (VIII)$$

where $R^{10}$ is hydrogen, halogen, or a $C_1$ to $C_4$ alkyl group. Most commonly, $R^{10}$ is hydrogen or methyl and, consequently, general formula VIII represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

The present alternating copolymer is prepared by a method including the steps of (a) providing a donor monomer composition comprising one or more donor monomers of structure I; (b) mixing an ethylenically unsaturated monomer composition comprising one or more acceptor monomers with (a) to form a total monomer composition; and (c) polymerizing the total monomer composition in the presence of a free radical initiator. In an embodiment of the present invention, the ethylenically unsaturated monomer composition includes monomers having the structure $CR^4_2=CR^3R^5$ as defined above.

In an embodiment of the present method, the monomer of structure I is present at a molar excess based on the amount of acceptor monomer. Any amount of excess monomer of structure I may be used in the present invention in order to encourage the formation of the desired alternating architecture. The excess amount of monomer of structure I may be at least 10 mol %, in some cases up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present method, monomer having the structure $CR^4_2=CR^3R^5$ is present in an amount of at least 15 mol %, in some cases 17.5 mol %, typically at least 20 mol %, and, in some cases, 25 mol % of the total monomer composition. The $CR^4_2=CR^3R^5$ monomer may further be present in an amount up to 50 mol %, in some cases up to 47.5 mol %, typically up to 45 mol %, and, in some cases, up to 40 mol % of the total monomer composition. The level of the $CR^4_2=CR^3R^5$ monomer used is determined by the properties that are to be incorporated into the copolymer composition. The $CR^4_2=CR^3 R^5$ monomers may be present in the monomer composition in any range of values inclusive of those stated above.

The ethylenically unsaturated monomer composition of the present method may include other donor monomers as described above, as well as other monomers designated by M and described above. The use of other mild acceptor monomers is optional in the present method. When other mild acceptor monomers are present, they are present at a level of at least 0.01 mol % of the copolymer composition, often at least 0.1 mol %, typically at least 1 mol %, and, in some cases, at least 2 mol % of the total monomer composition. The other acceptor monomers may be present at up to 35 mol %, in some cases up to 25 mol %, typically up to 15 mol %, and, in some cases, up to 10 mol % of the total monomer composition. The level of other acceptor monomers used herein is determined by the properties that are to be incorporated into the copolymer composition. Residues from the other acceptor monomers may be present in the copolymer composition in any range of values inclusive of those stated above.

The use of other monomers, M, is optional in the present method. When other monomers are present, they are present at a level of at least 0.01 mol % of the copolymer composition, often at least 0.1 mol %, typically at least 1 mol %, and, in some cases, at least 2 mol %. The other monomers may be present at up to 35 mol %, in some cases up to 25 mol %, typically up to 15 mol %, and, in some cases, up to 10 mol %. The level of other monomers used herein is determined by the properties that are to be incorporated into the copolymer composition. Residues from the other monomers, M, may be present in the copolymer composition in any range of values inclusive of those stated above.

In an embodiment of the present method, an excess of monomer of structure I is used, and the unreacted monomer of structure I is removed from the resulting copolymer composition by evaporation. The removal of unreacted monomer is typically facilitated by the application of a vacuum to the reaction vessel.

Any suitable free radical initiator may be used in the present invention. Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide; methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile, 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some case up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing, or during addition and mixing, polymerization of the monomers takes place. The present polymerization method can be run at any suitable temperature. Suitable temperature for the present method may be ambient, at least 50° C., in many cases at least 60° C., typically at least 75° C., and, in some cases, at least 100° C. Suitable temperature for the present method may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results from the present method may be utilized as a starting material for the preparation of other polymers by using functional group transformations by methods known in the art. Functional groups that can be introduced by these methods are epoxy, carboxylic acid, hydroxy, thiol, isocyanate, capped isocyanate, amide, amine, aceto acetate, methylol, methylol ether, oxazoline carbamate, and beta-hydroxyalkylamide.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide or, using a primary or secondary amine, can be converted to the corresponding N-substituted amide. Similarly, using a diamine such as ethylene diamine, one can convert the aforementioned copolymer of the present method to an N-aminoethylamide or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer of the present method directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively, one can prepare a carboxyl-functional copolymer by hydrolysis as described above, treat the carboxyl-functional copolymer with epichlorohydrin then alkali to produce the epoxy functional copolymer. These transformations can also be carried out exhaustively or in part. The resulting epoxy-functional copolymer can be further reacted with the appropriate active hydrogen containing reagents to form alcohols, amines, or sulfides.

Hydroxyl groups can be introduced directly using a hydroxyl-functional monomer such as hydroxyethyl acrylate in the copolymer of the present method, or they can be introduced by functional group transformation. By treating the carboxyl-functional copolymer described above with an epoxy, one can produce a hydroxyl functional polymer. Suitable epoxies include, but are not limited to, ethylene oxide, propylene oxide, butylene oxide, and glycidyl neodecanoate.

The above-described hydroxyl functional copolymers can be further reacted to form other copolymers. For example, a copolymer containing hydroxyethyl groups can be treated with a carbamylating agent, such as methyl carbamate, to produce the corresponding carbamate functional copolymer. With diketene or t-butyl acetoacetate, the hydroxyl groups can also be converted to acetoacetate esters.

Isocyanate functional copolymers can also be produced. Copolymers of the present method, which contain 2 or more hydroxyl groups, can be treated with a diisocyanate such as isophoronediisocyanate to produce isocyanate-functional polymers. Primary amine functional copolymers, described above, can be phosgenated to produce isocyanate functionality.

In an embodiment of the present invention, the composition contains co-reactive functional groups.

In a particular embodiment, the composition is a thermosetting composition. In this embodiment, the composition includes the above described alternating copolymer and at least one other component. The copolymer contains reactive functional groups and the other component contains functional groups that are reactive with the functional groups of the copolymer.

In an embodiment of the present invention, the functional groups of the copolymer are one or more selected from epoxy, carboxylic acid, hydroxy, thiol, isocyanate, capped isocyanate, amide, amine, aceto acetate, methylol, methylol ether, oxazoline carbamate, and beta-hydroxyalkylamide, and the functional groups of the other component are selected from epoxy, carboxylic acid, hydroxy, thiol, amide, amine, oxazoline, aceto acetate, methylol, methylol ether, isocyanate, capped isocyanate, beta hydroxyalkamide and carbamate. Typically, the functional group equivalent weight of the copolymer is from 100 to 5,000 grams/equivalent and the functional group equivalent weight of the other material is from 50 to 5,000 grams/equivalent.

In an embodiment of the present invention, the thermosetting composition may include additional fluorinated polymers. The additional fluorinated polymers may include functional groups selected from epoxy, carboxylic acid, hydroxy, thiol, isocyanate, capped isocyanate, amide, amine, aceto acetate, methylol, methylol ether, oxazoline carbamate, and beta-hydroxyalkylamide, which are reactive with the functional groups of the other component described above. As a non-limiting example, the additional fluorinated polymers may be those described in U.S. Pat. No. 4,345,057 to Yamabe et al., which is herein incorporated by reference. A specific, non-limiting example of the additional fluorinated polymers that may be used are the LUMIFLON polymers available from Asahi Glass Company, Ltd., Tokyo, Japan.

More particularly, the additional fluorinated polymers may include one or more curable fluorocopolymers that include from 40 to 60 mol % of fluoroolefin units, from 5 to 45 mol % of cyclohexyl vinyl ether units, from 5 to 45 mol % of alkyl vinyl ether units, and from 3 to 15 mol % of hydroxyalkyl vinyl ether units. Any suitable fluoroolefin monomers may be used to make the additional curable fluorocopolymers. Suitable fluoroolefins that may be used include, but are not limited to, chlorotrifluoroethylene, tetrafluoroethylene, trifluoroethylene, difluoroethylene, hexafluoropropylene and vinyl fluoride.

Typically, in the present thermosetting composition, the molar or equivalent ratio of functional groups in the present alternating copolymer and, optionally, the additional curable fluorocopolymers with the functional groups in the at least one other component is from 0.7:1 to 2:1.

A particular embodiment of the present invention is directed to a liquid thermosetting composition that includes an ungelled copolymer composition that includes the present fluorine-containing copolymer containing functional groups and, optionally, the additional curable fluorocopolymers with functional groups and a crosslinking agent having at least two functional groups that are reactive with the functional groups of the copolymer as the at least one other component.

In the liquid thermosetting composition, the functional groups in the fluorinated copolymer are any suitable functional groups as indicated above. The crosslinking agent will have suitable functional groups that will react with the functional groups in the copolymer. Suitable functional groups for the crosslinking agent include, but are not limited to, epoxy, carboxylic acid, hydroxy, thiol, amide, amine, oxazoline, aceto acetate, methylol, methylol ether, isocyanate, capped isocyanate, beta hydroxyalkamide, and carbamate.

The equivalent ratio of functional groups of the crosslinking agent to functional equivalents in the fluorinated functional copolymer is typically within the range of 1:3 to 3:1. The crosslinking agent is present in the liquid thermosetting composition in an amount of from 1 to 45 percent by weight, based on total weight of resin solids, and the fluorinated functional copolymer is present in an amount of from 55 to 99 percent by weight, based on total weight of resin solids.

A non-limiting example of the present liquid thermosetting composition is one where the functional group of the fluorinated copolymer is hydroxy and the functional group of the crosslinking agent is a capped polyisocyanate, where the capping group of the capped polyisocyanate crosslinking agent is one or more of hydroxy functional compounds, 1H-azoles, lactams, ketoximes, and mixtures thereof. The capping group may be phenol, p-hydroxy methylbenzoate, 1H-1,2,4-triazole, 1H-2,5-dimethyl pyrazole, 2-propanone oxime, 2-butanone oxime, cyclohexanone oxime, e-caprolactam, or mixtures thereof. The polyisocyanate of the capped polyisocyanate crosslinking agent is one or more of 1,6-hexamethylene diisocyanate, cyclohexane diisocyanate, α,α'-xylylene diisocyanate, α,α,α',α'-tetramethylxylylene diisocyanate, 1-isocyanato-3,3,5-trimethyl-5-isocyanatomethylcyclohexane, diisocyanato-dicyclohexylmethane, dimers of the polyisocyanates, or trimers of the polyisocyanates.

When the fluorinated copolymer has hydroxy functionality, it will typically have a hydroxy equivalent weight of from 100 to 10,000 grams/equivalent. The equivalent ratio of isocyanate equivalents in the capped polyisocyanate crosslinking agent to hydroxy equivalents in the hydroxy functional fluorinated copolymer is typically within the range of 1:3 to 3:1. In this embodiment, the capped polyisocyanate crosslinking agent is present in the liquid thermosetting composition in an amount of from 1 to 45 percent by weight, based on total weight of resin solids, and the hydroxy functional fluorinated copolymer is present in an amount of from 55 to 99 percent by weight, based on total weight of resin solids.

Another non-limiting example of the present liquid thermosetting composition is one where the fluorinated copolymer has epoxy functional groups and the crosslinking agent is a carboxylic acid functional compound having from 4 to 20 carbon atoms. The carboxylic acid crosslinking agent may be one or more of dodecanedioic acid, azelaic acid, adipic acid, 1,6-hexanedioic acid, succinic acid, pimelic acid, sebacic acid, maleic acid, citric acid, itaconic acid, or aconitic acid.

A further non-limiting example of the present liquid thermosetting composition is one where the fluorinated copolymer has carboxylic acid functional groups and the crosslinking agent is a beta-hydroxyalkylamide compound. The liquid thermosetting composition may further include a second polycarboxylic acid functional material selected from the group consisting of $C_4$ to $C_{20}$ aliphatic carboxylic acids, polymeric polyanhydrides, polyesters, polyurethanes, and mixtures thereof. The beta-hydroxyalkylamide may be represented by the following structure IX:

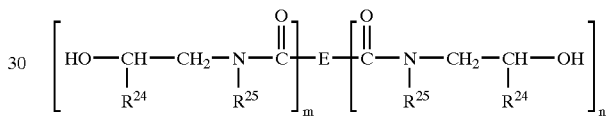

(IX)

where $R^{24}$ is H or $C_1$–$C_5$ alkyl; $R^{25}$ is H, $C_1$–$C_5$ alkyl, or a group having structure X:

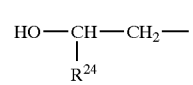

(X)

for which $R^{24}$ is as described above; E is a chemical bond or monovalent or polyvalent organic radical derived from saturated, unsaturated, or aromatic hydrocarbon radicals including substituted hydrocarbon radicals containing from 2 to 20 carbon atoms; m is 1 or 2; n is from 0 to 2; and m+n is at least 2.

The liquid thermosetting composition of the present invention is preferably used as a film-forming (coating) composition and may contain adjunct ingredients conventionally used in such compositions. Optional ingredients, such as, for example, plasticizers, surfactants, thixotropic agents, anti-gassing agents, organic cosolvents, flow controllers, anti-oxidants, UV light absorbers and similar additives conventional in the art, may be included in the composition. These ingredients are typically present at up to about 40% by weight based on the total weight of resin solids.

The liquid thermosetting composition of the present invention may be waterborne, but is usually solventborne. Suitable solvent carriers include the various esters, ethers, and aromatic solvents, including mixtures thereof, that are known in the art of coating formulation. The composition typically has a total solids content of about 40 to about 80 percent by weight. The liquid thermosetting compositions of the present invention will often have a VOC content of less than 4 percent by weight, typically less than 3.5 percent by weight and many times less than 3 percent by weight.

The liquid thermosetting composition of the present invention may contain color pigments conventionally used in surface coatings and may be used as a monocoat, that is, a pigmented coating. Suitable color pigments include, for examples inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include, in particular, aluminum flakes, copper bronze flakes, and metal oxide coated mica, nickel flakes, tin flakes, and mixtures thereof.

In general, the pigment is incorporated into the coating composition in amounts up to about 80 percent by weight based on the total weight of coating solids. The metallic pigment is employed in amounts of about 0.5 to about 25 percent by weight based on the total weight of coating solids.

In another embodiment, the present thermosetting composition is a co-reactable solid, particulate mixture, or powder of a reactant having at least two functional groups and a composition including the present fluorine-containing copolymer having functional groups, and, optionally, the additional curable fluorocopolymers with the functional groups. In the powder thermosetting composition, the reactant may have functional groups selected from epoxy, carboxylic acid, hydroxy, thiol, amide, amine, oxazoline, aceto acetate, methylol, methylol ether, isocyanate, capped isocyanate, beta hydroxyalkamide, and carbamate. The functional groups of the fluorine-containing copolymer are those indicated above. The functional groups of the reactant will react with the functional groups in the copolymer.

The fluorine-containing functional copolymer typically has a functional group equivalent weight of from 100 to 5,000 grams/equivalent and the equivalent ratio of reactant functional groups to functional copolymer functional groups is within the range of 1:3 to 3:1. Typically, the reactant is present in an amount of from 1 to 45 percent by weight, based on total weight of resin solids, and the functional copolymer is present in an amount of from 55 to 99 percent by weight, based on total weight of resin solids.

In an embodiment of the present powder thermosetting composition, the functional groups of the fluorinated copolymer are hydroxy functional groups and the reactant is a capped polyisocyanate crosslinking agent. In this embodiment, the capping group of the capped polyisocyanate crosslinking agent is one or more of hydroxy functional compounds, 1H-azoles, lactams, and ketoximes. The capping group is one or more of phenol, p-hydroxy methylbenzoate, 1H-1,2,4-triazole, 1H-2,5-dimethyl pyrazole, 2-propanone oxime, 2-butanone oxime, cyclohexanone oxime, and e-caprolactam. The polyisocyanate of the capped polyisocyanate crosslinking agent is one or more of 1,6-hexamethylene diisocyanate, cyclohexane diisocyanate, α,α'-xylylene diisocyanate, α,α,α',α'-tetramethylxylylene diisocyanate, 1-isocyanato-3,3,5-trimethyl-5-isocyanatomethylcyclohexane, 2,4,4-trimethyl hexamethylene diisocyanate, 2,2,4-trimethyl hexamethylene diisocyanate, diisocyanato-dicyclohexylmethane, dimers of said polyisocyanates, and trimers of the polyisocyanates.

The fluorinated hydroxy functional copolymer typically has a hydroxy equivalent weight of from 100 to 10,000 grams/equivalent and the equivalent ratio of isocyanate equivalents in the capped polyisocyanate crosslinking agent to hydroxy equivalents in the hydroxy functional copolymer is within the range of 1:3 to 3:1. Typically, the capped polyisocyanate crosslinking agent is present in an amount of from 1 to 45 percent by weight, based on total weight of resin solids, and the hydroxy functional copolymer is present in an amount of from 55 to 99 percent by weight, based on total weight of resin solids.

In another embodiment of the powder thermosetting composition, the functional groups of the fluorinated copolymer are epoxy functional groups and the reactant is a carboxylic functional reactant having from 4 to 20 carbon atoms. The carboxylic acid reactant is typically one or more of dodecanedioic acid, azelaic acid, adipic acid, 1,6-hexanedioic acid, succinic acid, pimelic acid, sebacic acid, maleic acid, citric acid, itaconic acid, and aconitic acid.

In a further embodiment of the powder thermosetting composition, the functional groups of the fluorinated copolymer are carboxylic functional groups and the reactant is a beta-hydroxyalkylamide. In this embodiment, the powder thermosetting composition may further include a second polycarboxylic acid, typically one or more of $C_4$ to $C_{20}$ aliphatic carboxylic acids, polymeric polyanhydrides, polyesters, polyurethanes, and mixtures thereof. The beta-hydroxyalkylamide is typically one represented by structure IX as detailed above.

The powder thermosetting composition of the present invention may also include one or more cure catalysts for catalyzing the reaction between the crosslinking agent and the functional copolymer. Classes of useful catalysts include metal compounds, in particular, organic tin compounds, and tertiary amines. Examples of organic tin compounds include, but are not limited to, tin(II) salts of carboxylic acids, e.g., tin(II) acetate, tin(II) octanoate, tin(II) ethylhexanoate and tin(II) laurate; tin(IV) compounds, e.g., dibutyltin oxide, dibutyltin dichloride, dibutyltin diacetate, dibutyltin dilaurate, dibutyltin maleate, and dioctyltin diacetate. Examples of suitable tertiary amine catalysts include, but are not limited to, diazabicyclo[2.2.2]octane and 1,5-diazabicyclo[4,3,0]non-5-ene. Preferred catalysts include tin (II) octanoate and dibutyltin(IV) dilaurate.

The powder thermosetting composition of the present invention may also include pigments and fillers. Examples of pigments include, but are not limited to, inorganic pigments, e.g., titanium dioxide and iron oxides; organic pigments, e.g., phthalocyanines, anthraquinones, quinacridones, and thioindigos; and carbon blacks. Examples of fillers include, but are not limited to, silica, e.g., precipitated silicas, clay, and barium sulfate. When used in the composition of the present invention, pigments and fillers are typically present in amounts of from 0.1 percent to 70 percent by weight, based on total weight of the thermosetting composition. More often, the thermosetting composition of the present invention is used as a clear composition being substantially free of pigments and fillers.

The powder thermosetting composition of the present invention may optionally contain additives such as waxes for flow and wetting, flow control agents, e.g., poly(2-ethylhexyl)acrylate, degassing additives such as benzoin, adjuvant resin to modify and optimize coating properties, antioxidants, and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of the thermosetting composition.

The powder thermosetting composition of the present invention is typically prepared by first dry blending the hydroxy functional polymer, the crosslinking agent, and additives, such as flow control agents, degassing agents and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C. The extrudate of the thermosetting composition of the present invention is cooled and, when used as a powder coating composition, is typically milled to an average particle size of from, for example, 15 to 30 microns.

The present invention is also directed to a method of coating a substrate, which includes the steps of:

(A) applying a thermosetting composition to the substrate;
(B) coalescing the thermosetting composition to form a substantially continuous film; and
(C) curing the thermosetting composition.

The thermosetting composition is typically the liquid thermosetting composition or powder thermosetting composition described above. The thermosetting composition includes the copolymer composition of the present invention, which includes a functional fluorinated copolymer as previously described and a crosslinking agent having at least two functional groups that are reactive with the functional groups of the functional copolymer.

The thermosetting compositions described above can be applied to various substrates to which they adhere, including wood; metals such as ferrous substrates and aluminum substrates; glass; plastic, and sheet molding compound based plastics.

The compositions can be applied by conventional means including brushing, dipping, flow coating, spraying, and the like, but they are most often applied by spraying. The usual spray techniques and equipment for air spraying and electrostatic spraying and either manual or automatic methods can be used. Substrates that may be coated by the method of the present invention include, for example, wood, metal, glass, and plastic.

The thermosetting composition of the present invention may be applied to the substrate by any appropriate means that are known to those of ordinary skill in the art. The thermosetting composition may be in the form of a dry powder or, alternatively, a liquid medium. When the substrate is electrically conductive, the thermosetting composition is typically electrostatically applied. Electrostatic spray application generally involves drawing the thermosetting composition from a fluidized bed and propelling it through a corona field. The particles of the thermosetting composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 3 to 6 mils (75 to 150 microns).

Alternatively, when the substrate is not electrically conductive, for example, as is the case with many plastic substrates, the substrate is typically preheated prior to application of the thermosetting composition. The preheated temperature of the substrate is equal to or greater than that of the melting point of the thermosetting composition, but less than its cure temperature. With spray application over preheated substrates, film builds of the thermosetting composition in excess of 6 mils (150 microns) can be achieved, e.g., 10 to 20 mils (254 to 508 microns).

When the thermosetting composition is a liquid, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition but, in general, a drying time of from about 1 to 5 minutes at a temperature of about 68–250° F. (20–121° C.) will be adequate. More than one coat of the composition may be applied to develop the optimum appearance. Between coats, the previously applied coat may be flashed, that is, exposed to ambient conditions for about 1 to 20 minutes.

After application to the substrate, the thermosetting composition is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three-dimensional crosslink network formed by covalent bond formation, e.g., between the free isocyanate groups of the crosslinking agent and the hydroxy groups of the polymer. The temperature at which the thermosetting composition of the present invention cures is variable and depends in part on the type and amount of catalyst used. Typically, the thermosetting composition has a cure temperature within the range of 130° C. to 160° C., e.g., from 140° C. to 150° C.

In accordance with the present invention, there is further provided a multi-component composite coating composition that includes a base coat layer deposited from a pigmented film-forming composition; and a substantially pigment free top coat applied over at least a portion of the base coat. Either the base coat or the top coat or both coats may include the liquid thermosetting composition or the powder thermosetting composition described above. The multi-component composite coating composition as described herein is commonly referred to as a color-plus-clear coating composition.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, polyurethanes, and the copolymer composition of the present invention.

The resinous binders for the pigmented film-forming base coat composition can be organic solvent-based materials, such as those described in U.S. Pat. No. 4,220,679, note column 2, line 24 through column 4, line 40. Also, water-based coating compositions such as those described in U.S. Pat. Nos. 4,403,003, 4,147,679, and 5,071,904 can be used as the binder in the pigmented film-forming composition.

The pigmented film-forming base coat composition is colored and may also contain metallic pigments. Examples of suitable pigments can be found in U.S. Pat. Nos. 4,220,679, 4,403,003, 4,147,679, and 5,071,904.

Ingredients that may be optionally present in the pigmented film-forming base coat composition are those which are well known in the art of formulating surface coatings and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,679, and 5,071,904.

The pigmented film-forming base coat composition can be applied to the substrate by any of the conventional coating techniques, such as brushing, spraying, dipping, or flowing, but are most often applied by spraying. The usual spray techniques and equipment for air spraying, airless spraying, and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition onto the substrate, and prior to application of the substantially pigment free top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The substantially pigment free top coat is applied over the deposited base coat by any of the methods by which coatings are known to be applied. In an embodiment of the present invention, the substantially pigment free top coat is applied by electrostatic spray application as described previously herein. When the substantially pigment free top coat is applied over a deposited base coat that has been dried, the two coatings can be co-cured to form the multi-component composite coating composition of the present invention. Both the base coat and top coat are heated together to conjointly cure the two layers. Typically, curing conditions of 130° C. to 160° C. for a period of 20 to 30 minutes are employed. The substantially pigment free top coat typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

EXAMPLE 1–3

These examples demonstrate the synthesis of the present fluorinated alternating copolymer. The following ingredients were used in the polymerizations:

| Ingredients | Example 1 | Example 2 | Example 3 |
|---|---|---|---|
| Charge 1 | | | |
| Diisobutylene | 1000 g | | |
| Isobutylene | | 1000 g | 1000 g |
| Aromatic 100[1] | | 500 g | 500 g |

| Ingredients | Example 1 | Example 2 | Example 3 |
|---|---|---|---|
| Charge 2 | | | |
| Di-t-amyl peroxide | 72 g | 60 g | 30 g |
| Charge 3 | | | |
| Cyclohexyl methacrylate | 667 g | | 250 g |
| Butyl Acrylate | 170.9 g | | |
| Hydroxyethyl acrylate | 341.8 g | 500 g | 250 g |
| Charge 4 | | | |
| Chlorotrifluoro ethylene | 222 g | 500 g | 500 g |
| Solids | 63.6 wt. % | 67.8 wt. % | 62.0 wt. % |
| Molecular Weight | | | |
| Mw | | 2,910 | 4,001 |
| Mn | | 1,285 | 1,622 |
| Mw/Mn | | 2.3 | 2.5 |

[1]ExxonMobil Chemical Company, Houston, TX

Charge 1 was added to a reaction flask equipped with an agitator, a thermocouple, and a nitrogen inlet. The flask was sealed, the solution was placed under a nitrogen blanket, and heated to 130° C. Charge 2 was then added to the reactor over a 2.5-hour period. Fifteen minutes after the Charge 2 addition was begun, Charges 3 and 4 were added simultaneously to the reactor over a 2-hour period. During the monomer addition, the temperature in the reactor was maintained at 130–150° C. and pressure of about 130 psi for diisobutylene and about 400 psi for isobutylene. After Charges 2, 3 and 4 were added, the reaction mixture was held for 2 hours at 150° C. The reactor was then cooled to 25° C. Gas chromatography analysis of the reaction mixture showed that all of the acrylates were reacted. The reported solids of the resulting polymer were determined at 110° C. for one hour. The reaction flask was then equipped for simple vacuum distillation and the reaction mixture heated to 155° C. to remove the unreacted diisobutylene or isobutylene. The vacuum-stripped resins were subsequently used to prepare coating compositions. The molecular weight was determined by gel permeation chromatography using polystyrene standards.

EXAMPLE 4–6

Coating compositions were prepared using the following ingredients:

| Ingredients | Example 4 | Example 5 | Example 6 |
|---|---|---|---|
| Component 1 | | | |
| Resin, Example 1 | 151 g | | |
| Resin, Example 2 | | 175.8 g | |
| Resin, Example 3 | | | 181.6 g |
| Shepard black pigment | 9.9 g | 11.8 g | 11.9 g |
| Cobalt aluminate blue pigment | 52.9 g | 63.1 g | 63.5 g |
| Sherwood green pigment | 4.6 g | 5.5 g | 5.5 g |
| Titanium dioxide | 5.9 g | 7.0 g | 7.0 g |
| hexamethylene diisocyanate | 76.7 g | 101.8 g | 97.0 g |
| Component 2 | | | |
| dibutyltin dilaurate | 1.6 g | 2.2 g | 2.1 g |
| UV absorber[3] | 5.1 g | 6.8 g | 6.5 g |
| Hindered Amine light stabilizer[4] | 4.9 g | 6.6 g | 6.2 g |

-continued

| Ingredients | Example 4 | Example 5 | Example 6 |
|---|---|---|---|
| Polybutylacrylate[5] | 1.6 g | 2.2 g | 2.1 g |
| aromatic hydrocarbon[6] | 23.1 g | 31.6 g | |

[3]CYSORB 1164, Cytec Industries
[4]SANDUVOR 3055 available from Clariant International Limited, London, U.K.
[5]BYK 322 available from BYK Chemie Division of ALTANA AG, Bad Homburg, Germany
[6]ExxonMobil Chemicals The resins were charged to a paint can and the various pigments were added in the order indicated with mixing. The mixture was then added to a mixing mill and milled with a zircoa media until a Hegman grind of 7+ was obtained. This formed component one of a two-component composition. Component two was prepared by adding the rest of the ingredients in the order indicated to a second vessel and mixing to form a homogeneous mixture. The two components were, kept separate until immediately before application.

The coating compositions were applied to both a galvanized steel substrate and an aluminum substrate as shown in the table below. The coatings were cured at the temperature and time indicated in the table. The dry film thickness in mils is also reported in the table. After cure, the 60° gloss, T-bend flexibility, pencil hardness, reverse impact strength, and resistance to methyl ethyl ketone solvent was determined. The 60° gloss was measured with a 60° gloss meter from Byk-Gardner Instrument Company.

The T-bend test was evaluated for loss of adhesion and for cracking after the coated panel was bent to varying degrees. The first number indicates the diameter of the bend is so many times the thickness of the steel panel. For example, a "3" indicates that the diameter of the bend was three times the thickness of the steel panel before loss of adhesion was indicated. Loss of adhesion was determined by pressing a piece of adhesive tape down onto the film surface and then quickly ripping the tape from the film. The second number was a subjective number related to cracking. The rating was assigned on a scale of 1 to 9. A score of 9 indicated no cracking and no film removal with the tape, while a score of 0 indicated severe cracking and complete film removal by the tape.

The pencil hardness is a measure of the resistance of the coating to a pencil indentor. The pencil hardness scale begins with 4B, which indicates a relatively soft coating, and increases to 10H, which indicates a relatively hard coating. The scale reads as follows: 4B, 3B, 2B, B, HB, F, H, 2H, 3H up to 10H. The coating was indented with pencils of increasing hardness until the pencil scratched or etched the surface.

The reverse impact resistance was determined by subjecting the cured coatings to 60 inch-pounds of reverse impact according to ASTM D2794. The impacted films were observed visually for the amount of cracking and for removal of the film after a piece of adhesive tape was pressed down onto the film surface and then quickly ripped from the film. The results were given a pass (P) or fail (F) rating with P indicating no cracking and no film removal with the tape, while F would indicate cracking and/or film removal.

The solvent resistance test was done with methyl ethyl ketone (MEK). A cloth was saturated with MEK and rubbed back and forth (double rub) until the coating was marred (MEK Mar value) and until the coating was removed from the substrate (MEK Number, a value of 100 indicates that the coating was not removed). The values in the Table are from double rubs.

| Coating | Ex. 7 Ex. 4 | Ex. 8 Ex. 5 | Ex. 9 Ex. 6 | Ex. 10 MEGAFLON 552[2] | Ex. 11 DURANAR[7] |
|---|---|---|---|---|---|
| GLAVANIZED SUBSTRATE | | | | | |
| Cure Temperature (° F.) | 465 | 465 | 465 | 465 | 465 |
| Cure Time (seconds) | 20–30 | 20–30 | 20–30 | 20–30 | 20–30 |
| Dry Film Thickness (mils) | 0.75–0.85 | 0.75–0.85 | 0.75–0.85 | 0.75–0.85 | 0.75–0.85 |
| 60° Gloss | 56.7 | 67.6 | 76.4 | 71.4 | 29.6 |
| T-Bend | 0/4 | 3/5+ | 2/3 | 0/5+ | 0/5+ |
| Pencil Hardness | 2 H | H | F | H | F |
| Reverse Impact Resistance | P | P | P | P | P |
| MEK Mar | 2 | 2 | 2 | 1 | 2 |
| MEK Number | 100 | 100 | 100 | 100 | 100 |
| ALUMINUM SUBSTRATE | | | | | |
| Cure Temperature (° F.) | 465 | 465 | 465 | 465 | 465 |
| Cure Time (seconds) | 20–30 | 20–30 | 20–30 | 20–30 | 20–30 |
| Dry Film Thickness (mils) | 0.75–0.85 | 0.75–0.85 | 0.75–0.85 | 0.75–0.85 | 0.75–0.85 |
| 60° Gloss | 53.3 | 48.8 | 57.6 | 49.0 | 21.8 |
| T-Bend | 2/3 | 3/5 | 3/5+ | 0/2 | 0/0 |
| Pencil Hardness | 2 H | 2 H | 2 H | H | H |
| Reverse Impact Resistance | F | F | P | P | P |

[2]Available from PPG Industries, Pittsburgh, PA, includes LUMIFLON LF552, Asahi Glass Ltd., Tokyo, Japan
[7]Available from PPG Industries The data demonstrate the excellent balance of film hardness and flexibility, as well as the durability of coatings derived from thermosetting compositions containing the present fluorine-containing copolymer.

The present invention has been described with reference to specific details of particular embodiments thereof. It is not intended that such details be regarded as limitations upon the scope of the invention except insofar as and to the extent that they are included in the accompanying claims.

We claim:

1. A composition comprising a fluorine-containing copolymer comprised of at least 50 mol % of residues having the following alternating structural unit:

—[DM—AM]— wherein DM represents a residue from a donor monomer having the following structure (I):

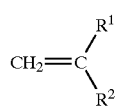

(I)

wherein $R^1$ is linear or branched $C_1$ to $C_4$ alkyl; $R^2$ is selected from the group consisting of methyl, linear, cyclic or branched $C_1$ to $C_{20}$ alkyl, alkenyl, aryl, alkaryl and aralkyl; and AM represents a residue from an acceptor monomer; wherein the copolymer contains at least 5 wt. % fluorine, wherein the copolymer is prepared by polymerizing a molar excess of the monomer of structure I, based on the amount of acceptor monomer.

2. The composition of claim 1, wherein the structural unit —[DM-AM]— in the fluorine-containing copolymer comprises residues having the following structural units (I):

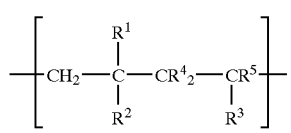

(I)

wherein $R^1$ and $R^2$ are as defined above; $R^3$ is a group containing a halide selected from the group consisting of chlorine and fluorine; and $R^4$ and $R^5$ are independently selected from the group consisting of H, Cl, and F.

3. The composition of claim 1, wherein the copolymer further comprises one or more residues derived from other ethylenically unsaturated acrylic monomers described by structure (III):

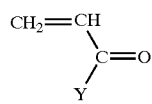

(III)

wherein Y is selected from the group consisting of $-NR^3_2$, $-O-R^5-O-C(=O)-NR^3_2$, and $-OR^4$; $R^3$ is selected from the group consisting of H, linear or branched $C_1$ to $C_{20}$ alkyl and linear or branched $C_1$ to $C_{20}$ alkylol; $R^4$ is selected from the group consisting of H, hydroxy functional poly(ethylene oxide), hydroxy functional poly(propylene oxide), linear, cyclic, or branched $C_1$ to $C_{20}$ alkyl, alkylol, aryl alkaryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical; and $R^5$ is a divalent linear or branched $C_1$ to $C_{20}$ alkylene linking group.

4. The composition of claim 1, wherein the copolymer includes at least one functional group of one or more selected from the group consisting of epoxy, carboxylic acid, hydroxy, thiol, isocyanate, capped isocyanate, amide, amine, acetoacetate, methylol, methylol ether, oxazoline, carbamate, and beta-hydroxyalkylamide.

5. The composition of claim 2, wherein the structural units (I) of the copolymer comprise at least 30 mol % of the copolymer.

6. The composition of claim 1, wherein the donor monomer is one or more selected from the group consisting of isobutylene, diisobutylene, isoprenol, 1-octene, and dipentene.

7. The composition of claim 1, wherein the acceptor monomer residue is selected from the group consisting of chlorotrifluoroethylene, tetrafluoroethylene, trifluoroethylene, difluoroethylene, vinyl fluoride, hexafluoropropylene, acrylic acid, acrylic acid esters, acrylamide, N-alkyl substituted acrylamides, acrylonitrile and mixtures thereof.

8. The copolymer composition of claim 1, wherein the copolymer further comprises one or more residues derived from other ethylenically unsaturated monomers of general formula V:

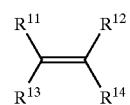

(V)

wherein $R^{11}$, $R^{12}$, and $R^{14}$ are independently selected from the group consisting of H, halides, $CF_3$, straight or branched alkyl of 1 to 20 carbon atoms, aryl of 6 to 12 carbon atoms, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; and $R^{13}$ is selected from the group consisting of H, halides, $C_1$–$C_6$ alkyl, $COOR^{18}$, wherein $R^{18}$ is selected from the group consisting of H, an alkali metal, a $C_1$ to $C_6$ linear, cyclic, or branched alkyl group, glycidyl, and aryl.

9. The composition of claim 8, wherein the other ethylenically unsaturated monomers are one or more selected from the group consisting of methacrylic monomers and allylic monomers.

10. The composition of claim 1, wherein the copolymer has a number average molecular weight of from 500 to 16,000 and a polydispersity index of less than 4.

11. The composition of claim 1, wherein the composition contains co-reactive functional groups.

12. The composition of claim 11, wherein the composition is a thermosetting composition.

13. The composition of claim 12, comprising
 (a) the copolymer and (b) at least one other component; wherein (a) contains reactive functional groups and (b) contains functional groups that are reactive with the functional groups of (a).

14. The composition of claim 13, wherein the functional groups of the copolymer are one or more selected from the group consisting of epoxy, carboxylic acid, hydroxy, thiol, isocyanate, capped isocyanate, amide, amine, aceto acetate, methylol, methylol ether, oxazoline carbamate, and beta-hydroxyalkylamide.

15. The composition of claim 13, wherein the functional groups of (b) are selected from the group consisting of epoxy, carboxylic acid, hydroxy, thiol, amide, amine, oxazoline, aceto acetate, methylol, methylol ether, isocyanate, capped isocyanate, beta hydroxyalkamide, and carbamate.

16. The composition of claim 13, wherein (a) has a functional group equivalent weight of from 100 to 5,000 grams/equivalent.

17. The composition of claim 13, wherein (a) further comprises a curable fluorocopolymer comprising 40 to 60 mol % of fluoroolefin units, 5 to 45 mol % of cyclohexyl vinyl ether units, 5 to 45 mol % of alkyl vinyl ether units, and 3 to 15 mol % of hydroxyalkyl vinyl ether units.

18. The composition of claim 17, wherein the fluoroolefins are one or more selected from the group consisting of chlorotrifluoroethylene, tetrafluoroethylene, trifluoroethylene, difluoroethylene, hexafluoropropylene, and vinyl fluoride.

19. The composition of claim 13, wherein the ratio of the functional groups in (a) to the functional groups in (b) is from 0.7:1 to 2:1.

20. A substrate, wherein at least a portion of the substrate is coated with the thermosetting composition of claim 12.

21. A substrate, wherein at least a portion of the substrate is coated with the thermosetting composition of claim 13.

22. A substrate, wherein at least a portion of the substrate is coated with the thermosetting composition of claim 17.

23. A multi-layer composite coating comprising:
(A) a base coat layer deposited from a pigmented film-forming base coat thermosetting composition; and
(B) a substantially pigment free top coat deposited from a top coat composition over at least a portion of the base coat layer; wherein one or both of (A) and (B) comprise the thermosetting composition of claim 12.

24. A multi-layer composite coating comprising:
(A) a base coat layer deposited from a pigmented film-forming base coat thermosetting composition; and
(B) a substantially pigment free top coat deposited from a top coat composition over at least a portion of the base coat layer; wherein one or both of (A) and (B) comprise the thermosetting composition of claim 13.

25. A multi-layer composite coating comprising:
(A) a base coat layer deposited from a pigmented film-forming base coat thermosetting composition; and
(B) a substantially pigment free top coat deposited from a top coat composition over at least a portion of the base coat layer; wherein one or both of (A) and (B) comprise the thermosetting composition of claim 17.

26. A substrate, wherein at least a portion of the substrate is coated with the multi-layer composite coating of claim 23.

27. A substrate, wherein at least a portion of the substrate is coated with the multi-layer composite coating of claim 24.

28. A substrate, wherein at least a portion of the substrate is coated with the multi-layer composite coating of claim 25.

* * * * *